(12) United States Patent
Weaver et al.

(10) Patent No.: US 6,400,335 B1
(45) Date of Patent: Jun. 4, 2002

(54) DYNAMIC LOAD SHARING SYSTEM AND METHOD USING A CYLINDRICAL ANTENNA ARRAY

(75) Inventors: Carl Francis Weaver, Morris Plains; Xiao Cheng Wu, Parsippany, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/635,980

(22) Filed: Aug. 9, 2000

(51) Int. Cl.[7] .......................... H01Q 21/00; H01Q 3/02
(52) U.S. Cl. ..................... 343/853; 342/374; 342/372; 455/453
(58) Field of Search ................................ 343/853, 893, 343/890; 370/335, 342, 500; 342/374, 372, 375

(56) References Cited

U.S. PATENT DOCUMENTS

| | | | |
|---|---|---|---|
| 5,276,907 A | 1/1994 | Meidan | 455/33.3 |
| 5,805,996 A | 9/1998 | Salmela | 455/453 |
| 5,812,542 A * | 9/1998 | Bruckert et al. | 370/335 |
| 5,889,494 A | 3/1999 | Reudink et al. | 342/373 |
| 5,966,094 A | 10/1999 | Ward et al. | 342/373 |
| 6,094,166 A | 7/2000 | Martek et al. | 342/374 |
| 6,188,373 B1 * | 2/2001 | Martek | 343/893 |

FOREIGN PATENT DOCUMENTS

| | | |
|---|---|---|
| EP | 0 777 400 A2 | 6/1997 |
| WO | 98/39851 | 9/1998 |

* cited by examiner

*Primary Examiner*—Tan Ho
*Assistant Examiner*—James Clinger
(74) *Attorney, Agent, or Firm*—Harness, Dickey & Pierce, P.L.C.

(57) ABSTRACT

Antenna components of a cylindrical antenna array are adjusted, to dynamically share loads among sectors of a cell or between cells. The antenna components are adjusted based on beam configuration and/or orientation for example, depending upon a monitored load, to thereby vary antenna coverage areas to adjust for varying traffic densities. Antenna components are adjusted to accommodate load variations within a cell, and/or between cells.

33 Claims, 5 Drawing Sheets

DYNAMIC LOAD SHARING SYSTEM AND METHOD USING A CYLINDRICAL ANTENNA ARRAY

BACKGROUND OF THE INVENTION

1. Field of the Invention

The invention is generally directed to antennas and loads on antennas created by wireless communication.

2. Description of Related Art

Wireless communication systems typically involve information from individual wireless or landline callers being sent to and from other wireless or landline callers via base stations and wireless communication switching centers. Each base station typically includes three antennas, or a single three component antenna 20 as shown in prior art FIG. 1 (which is most times a 3 pole or 3 component antenna as represented by element 20A, 20B and 20C). The coverage area or cell 10 serviced by the base station antenna 20 varies in size, depending upon the strength or power of the antenna; the distance between base station antennas 20; and other various parameters.

Base station antenna 20 typically includes three antenna components 20A, 20B and 20C, each component being set up and remaining in a fixed position. Each of the three antenna components 20A, 20B and 20C provides a fixed beam pattern and orientation covering a fixed sector such as that shown in FIG. 1, and represented by elements 30A, 30B and 30C. The beam patterns 30A–C as shown in FIG. 1 dictate the area or sector from which information can be received from wireless communication units and to which information can be sent.

In one aspect of a wireless communication, namely in cellular/PCS, code division multiple access (CDMA) technology provides for a large capacity of information to be communicated. The capacity in a CDMA system, in essence, does not have a hard limit. Problems occur, however, due to limits of the antenna 20 as shown in FIG. 1, created by the fixed beam patterns and orientations, and the fixed sectors of coverage 30A, 30B and 30C. Basically, although each component 20A, 20B and 20C of antenna 20 covers a certain fixed sector or area of the cell 10, wireless activity or traffic between sectors within the cell 10 may not be equal. Thus, a need exists for dynamically distributing the traffic load among various antenna components and coverage sectors within a cell.

Further, each cell 10 includes neighboring cells as shown by the dashed lines in FIG. 1, with each neighboring cell similarly including a base station antenna 20 with the antenna components 20A, 20B and 20C, for handling a traffic load within the neighboring cell. However, while traffic loads can vary among sectors within a cell, traffic loads can also vary from cell to cell. Thus, a need exists for dynamically distributing traffic load among neighboring cells.

In current CDMA systems, with cells including antennas 20 and antenna sector components 20A, 20B and 20C including fixed beam patterns and orientations, one known way of achieving some dynamic load sharing functionality between cells is by adjusting transmit power of the base station within a certain range. However, this only achieves a very limited amount of dynamic loading sharing. Further, any reduction in base station transmit power may potentially create a coverage hole where a wireless communication call may inadvertently be dropped or unable to be connected. Thus a need for a better way to dynamically distribute a traffic load among neighboring cells exists.

When a cell is heavily loaded, it may reject requests to establish and handle a new wireless call. Further, it may also deny soft handoffs to another base station in a neighboring cell when the traffic load gets too heavy. Each of these can cause degradation in the performance and restriction on capacity of the overall system. Finally, in the real world, traffic load distributions are extremely non-uniform and time varying, thus creating more of a need for dynamic load sharing within cells and among neighboring cells.

SUMMARY OF THE INVENTION

A system and method have been developed wherein a cylindrical antenna array is used in a system involving dynamic load sharing. Antenna component configurations of the cylindrical antenna array are adjusted, including beam configuration and orientation for example, based on the determined load to thereby vary antenna coverage areas or sectors to accommodate varying traffic densities. The dynamic load sharing can accommodate such variations within a cell, and/or between cells.

BRIEF DESCRIPTION OF THE DRAWINGS

The present invention will become more fully understood from the detailed description given hereinbelow and the accompanying drawings which are given by way of illustration only, and thus are not limitative of the present invention, wherein like reference numerals represent like elements, and wherein.

DETAILED DESCRIPTION OF PREFERRED EMBODIMENTS

An antenna array system of the present invention utilizes a cylindrical antenna array and a controller to dynamically vary the load on various components of an antenna within sectors of a cell, between antennas within a cell, and/or between antennas of neighboring cells. The wireless communication call handling load on various antenna components of the cylindrical antenna array is determined and antenna component configuration, including beam configuration and/or orientation, for example, is adjusted based upon the determined load within various sectors or cells. Since traffic densities in a wireless system vary, causing certain sectors or coverage areas within a cell or among neighboring cells to be overloaded, an adaptable antenna system is needed. Such a need is fulfilled by an adaptable antenna system and method of the present invention, which provides for dynamic load sharing within a cell and/or between cells.

Figure 1:
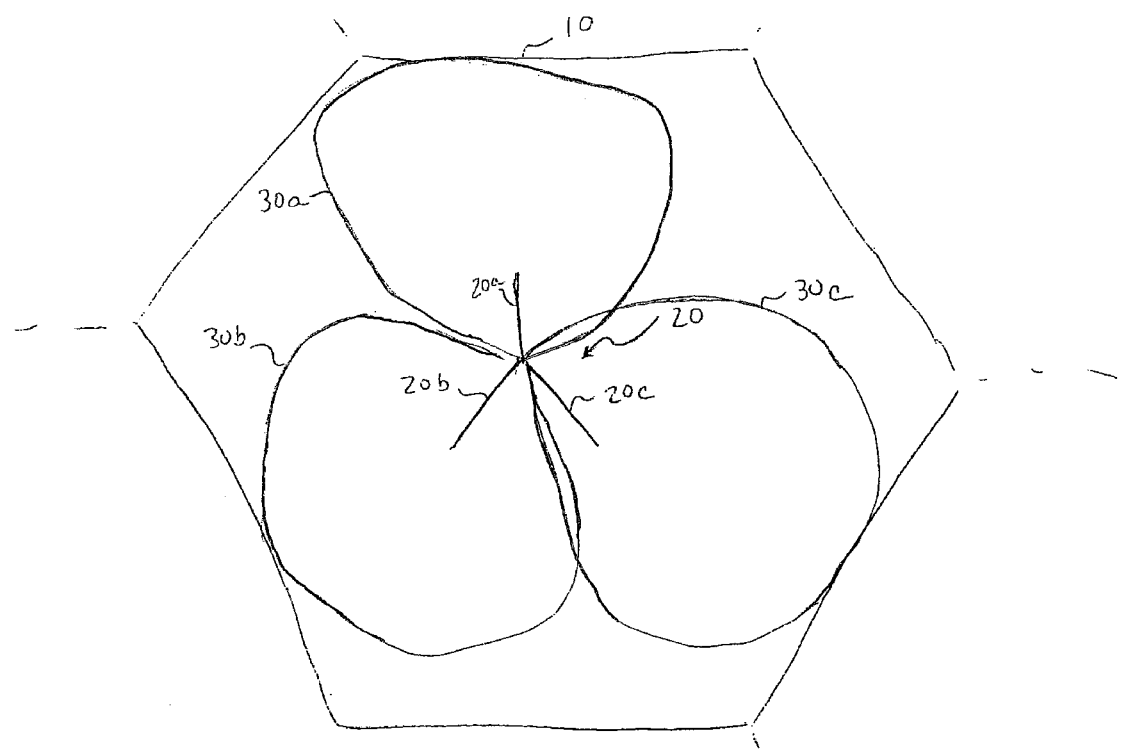
FIG. 1 is a prior art illustration of a fixed antenna and its coverage areas.
Figure 2:
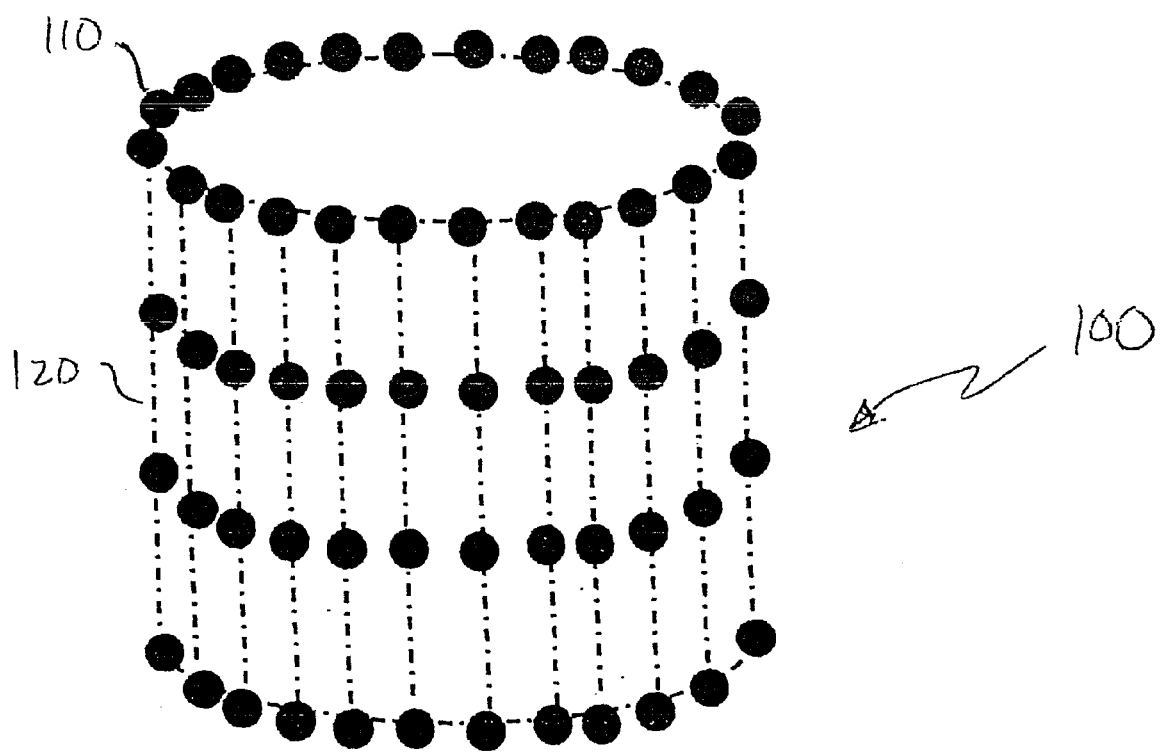
FIG. 2 is a depiction of a cylindrical antenna array.

FIG. 2 is an illustration of a cylindrical antenna array 100 for use in the antenna system and method of the present invention. The cylindrical antenna array is preferably a stack of circular arrays 110 (four of which are shown in FIG. 2, with four being shown for exemplary purposes only and thus which should not be considered limitative of the present invention). The circular arrays 110 provide flexible beam width and a steerable beam pattern. The vertical beam pattern 120 aspect of the cylindrical antenna array 100 provides steerable tilting capability such as down-tilting and up-tilting for example. By combining this functionality of the cylindrical antenna array with a dynamic control mechanism as will be discussed hereafter with regard to FIG. 3, antenna component configuration of the cylindrical antenna array 100 can varied to support dynamic down-tilting and up-tilting, dynamic azimuth rotation (change in beam orientation) and dynamic beam width adjustment (beam configuration adjustment). Further, the cylindrical antenna array 100 is controllable to vary antenna component configuration by adjusting the number of antenna components (from three to six for example), as well as the size, shape, etc., of their coverage areas.

The cylindrical antenna array 100 is programmable in a known manner to provide, for example, three antenna components covering three sectors of a cell 10 (similar to that of the antenna 20). The difference is that the cylindrical antenna array 100 provides a flexible configuration of antenna components, wherein antenna pattern (beam configuration), orientations, etc., are variable to vary sector size covered by an antenna component. By combining the capabilities of the flexible configuration of the cylindrical antenna array 100 (as will be described in more detail with regards to FIGS. 4(*a*)–(*f*)) with dynamic control, traffic loads within sectors of a cell, and/or among neighboring sectors or cells can be dynamically distributed. This will be described in more detail with regard to FIG. 3.

Figure 3:
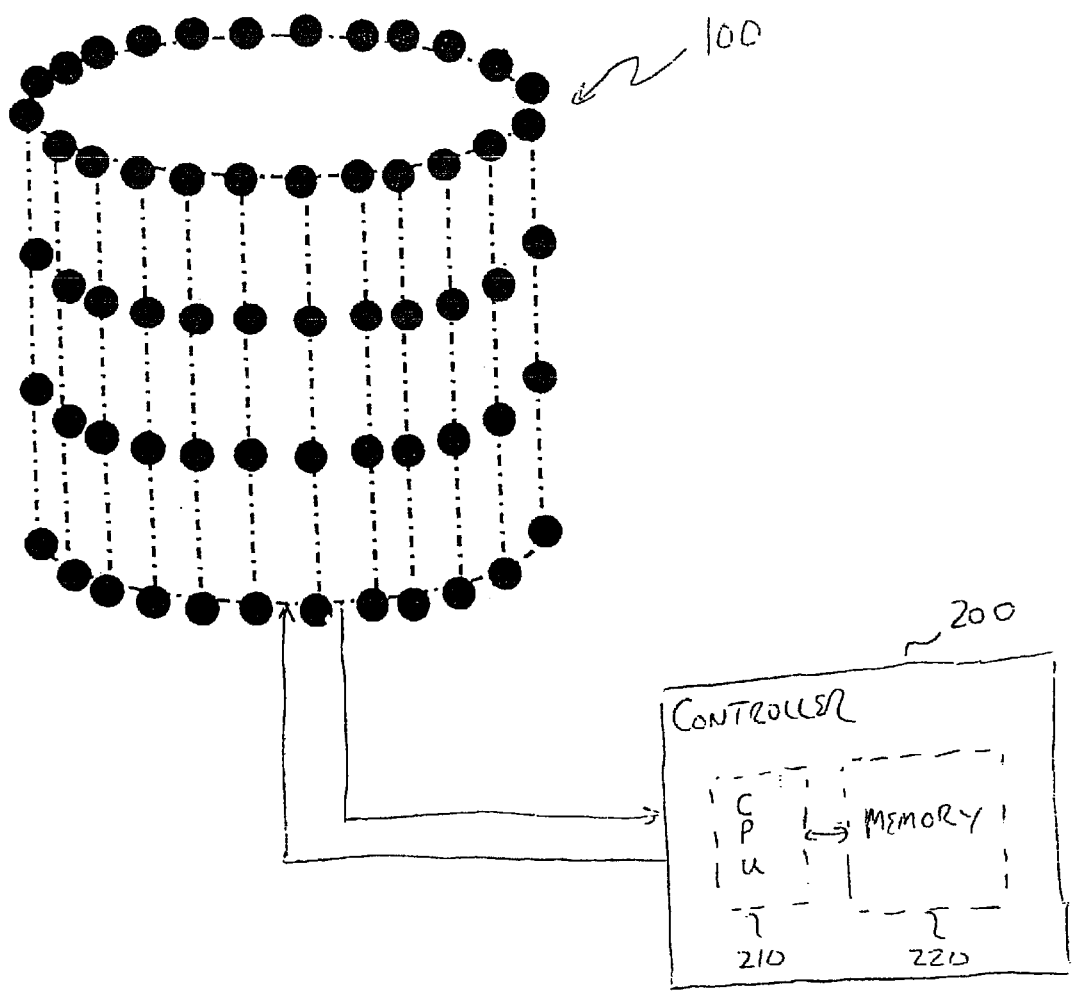
FIG. 3 is a depiction of an antenna system of the present invention.
Figure 4A:
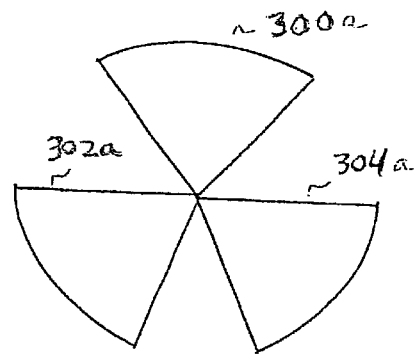
FIGS. 4a–4f are depictions of beam patterns or orientations and their variations based upon the present invention.
Figure 4B:
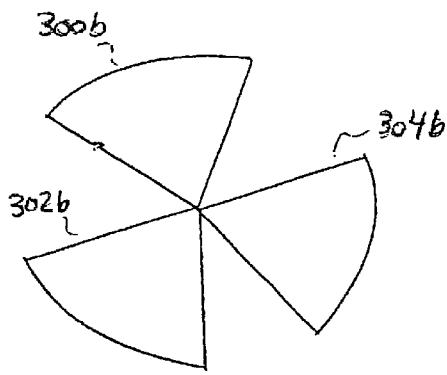
Figure 4C:
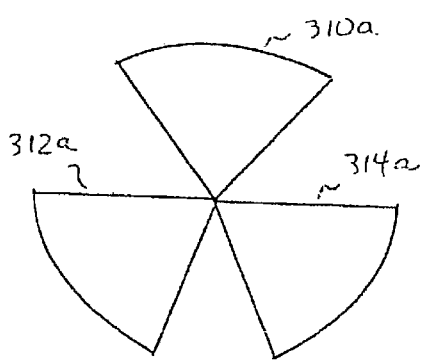
Figure 4D:
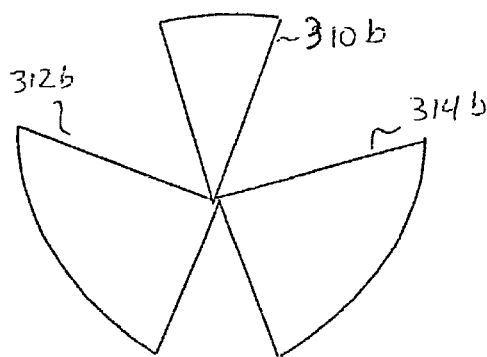
Figure 4E:
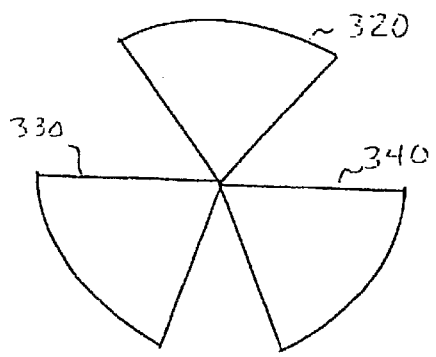
Figure 4F:
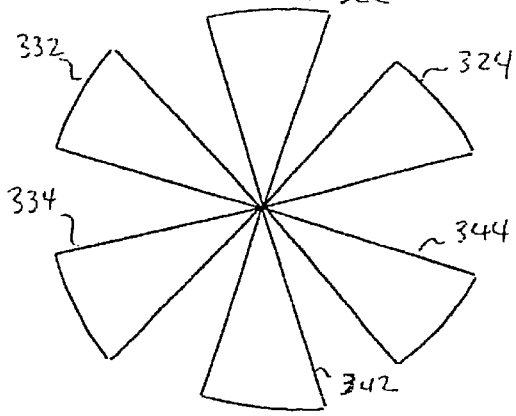

FIG. 3 is a depiction of an antenna system of the present invention including a cylindrical antenna array 100 and a controller 200. The controller includes, for example, a central processing unit 210 and a memory 220. The controller 200 not only has the capability of initially configuring the cylindrical antenna array 100 by setting the number of antenna components (such as three or six for example), as well as an antenna pattern or beam configuration, and orientation (similar to that shown in FIGS. 4 *a–f* or in any designated three, six, etc., sector pattern with a different beam or antenna pattern orientation) in a known manner, but also has the function of reconfiguring the antenna components of the cylindrical antenna array based upon a determined load. The reconfiguration is controlled by controller 200 which may be a base station (BTS) controller; a controller associated with a plurality of base stations (BSC), or a controller located at a remote location such as a central switching station (MSC), as will be explained hereafter.

Further, the controller 200 dynamically adjusts antenna component configuration such as the number of antenna components, beam configuration, tilt and/or orientation in a dynamic manner based upon configurations determined from variations in the determined loads. More preferably, the system has the ability to determine the load for each of the designated antenna components of the cylindrical array established at any given time (such as those initially established for example), and further has the capability of then controlling a controller to dynamically adjust antenna components configuration and/or orientation of the cylindrical antenna array components so as to thereby distribute load more evenly among cell sectors or between cells, based upon the determined load. This will be described in more detail as follows.

In wireless technology, and more preferably in cellular/PCS systems, one or more cylindrical antenna arrays 100 are used to cover areas of a cell by configuring the cylindrical antenna array 100 into, for example, three antenna components, each with a beam pattern or configuration, tilt and orientation. To fully take advantage of the large capacity and essentially soft limit provided to wireless systems by CDMA technology for example, the load on each of the antenna components of the cell is monitored at a remote location. As the traffic in a particular sector of the cell gets relatively heavily loaded, antenna component reconfiguration parameters are determined and sent to the controller 200 which adjusts antenna component configuration. For example, the controller 200 controls the cylindrical antenna array 100 to adjust beam configuration for example, by narrowing beam width of one antenna component of the cylindrical array 100 and widening beam width of another antenna component within the same cell. This reduces the load of one antenna component within the cell and increases the load of another antenna component so as to more evenly distribute the load on the traffic cylindrical antenna array 100 despite the relative increase in traffic load of one sector of a cell as compared to another sector of the cell.

As previously stated, load can be determined at any remote location and antenna component reconfiguration parameters can be automatically or semi-automatically determined and sent to a BTS controller (associated with a single base station and a plurality of sectors within a cell), a BSC (associated with a plurality of base stations and thus a plurality of neighboring cells), or a centrally located controller located in an MSC, for example (which is again associated with a plurality of base stations and a plurality of cells). One example of load detection, within sectors of a cell or across adjacent cells, involves monitoring of the ratio of pilot power to total transmit power.

Pilot power is defined in CDMA technology, for example, as an uncoded channel which is unique to a sector. The pilot power is normally fixed. The total transmit power, on the other hand, is variable and equates to the pilot power within a sector plus the power supplied in association with the users of wireless mobile units (mobile phones) within the sector. In certain instances, power associated with the wireless mobile units vary based on needs to increase power to maintain signal reception, etc., such that the farther a wireless mobile unit moves from a base station, the more total transmit power is necessary to maintain the signal.

The ratio of pilot power to total transmit power can not go below a fixed value, such as ten percent. Thus, in the past, power adjustments had to be made at multiple threshold levels such that when the ratio was at fifteen percent, for example, transmit power was reduced in some instances; and when the ratio reached ten percent, for example, the base station no longer received any incoming calls. Such aspects of power reduction and the removal of the capability to receive incoming calls need not initially take place in the present system, however, wherein, at various adjustable pilot power to total transmit power threshold percentage levels, adjustments of antenna components of cylindrical antenna array 100 take place to shift load.

More preferably, as the ratio of pilot power to total transmit power is determined to approach various selectable threshold levels (which can be set at 15% or 10%, for example), antenna component reconfiguration parameters are determined so that the antenna components of the cylindrical antenna array 100 are controlled by a controller 200 in any number of various ways so as to redistribute the load. This includes adjusting beam configuration, angle, sector patterns, etc., so as to increase the ratio of pilot power to total transmit power within the sector or cell, thereby distributing the load among the sectors within the cell (or between cells).

Load is preferably monitored in a location remote from controller 200 of the base station. Using this load information, antenna component configuration parameters for reconfiguring antenna components of a corresponding cylindrical array 100 are determined. These determinations are made in a semi-automatic manner by a skilled operator, such as an RF engineer, following preset rules (involving the selectable thresholds and preferred adjustments based upon information received) or guidelines; or in an automatic manner by a computer following preset or preprogrammed rules or guidelines. The determinations are forwarded to a corresponding controller 200 which controls antenna component adjustment of a corresponding cylindrical antenna array 100.

Accordingly, if the load is particularly heavy in one sector, instead of preventing the ratio from decreasing by refusing to accept any new incoming calls in that sector due to the unusually heavy load, beam adjustment, for example, is determined wherein a beam configuration is controlled to be narrowed within a heavy loaded sector and increased within a lightly loaded sector so as to redistribute the load within the sector. This detection of pilot power, transmit power and ratios of pilot power to transmit power within sectors of the cell and among cells is done in a known fashion; but instead of dropping calls and refusing to take new calls to adjust the ratio, reconfiguration parameters are either automatically or semi-automatically determined based upon preset rules and the cylindrical antenna array 100 is adjusted by controller 200 varying beam configuration, etc., within the cell (or among cells) thereby dynamically redistribute the load. Examples of rules, used by a skilled operator or a computer receiving the load information to determine the antenna component parameter reconfigurations are as follows.

Similarly, load is distributable among cells. For example, a BSC controller (such as 250 of FIG. 5) is connected to controllers 200 of neighboring cells and/or controls cylindrical antenna arrays 100 of neighboring cells. Power ratio values for ratios of pilot power to total transmit power for the neighboring cells are received and added up and/or compared so as to determine whether or not the load is particularly heavy in one cell and particularly light in another cell. In such a case, the BSC 250 initiates (or controls controller 200) a beam tilting operation as will be further discussed with regard to FIG. 5, for example, wherein the beam pattern of one cylindrical antenna array 100 is tilted up and the beam pattern of another cylindrical antenna array is tilted down so as to relatively increase the traffic load in one cell and relatively decrease the traffic load in another cell. The aspects of using different ways to adjust or redistribute traffic load among cell sectors or between cells will be explained hereafter in more detail. It should be noted, however, that although the use of the pilot power to total transmit power ratio as a threshold for triggering load redistribution is preferred, other characteristics representative of detected loads can also be used, and are encompassed within the scope of the present invention.

This redistribution of load among cell sectors (or between cells) is important because traffic load within a cell continuously varies over the course of a day, a week, a month, a year, etc. In the real world, traffic load distributions are extremely non-uniform and time varying. For example, one sector (or cell) may support a lot of traffic and thus bear a heavy load during the morning hours, and bear less of a load in the afternoon (due to rush hour to and from work causing different sectors of a cell to be heavy/light in the morning and light/heavy in the afternoon, for example), with the heavy traffic shifting to the other sector during the afternoon. By monitoring these trends over time and determining that the load in one sector is extremely heavy at any given time, and by determining adjustments for antenna component configuration of the cylindrical antenna array 100 in that sector (lessening its load) and in another sector (making it absorb more load), the antenna component of the lightly loaded sector can handle a portion of the load so that no sector becomes overloaded. As such, requests to establish new calls do not get rejected and calls do not get dropped. Narrowing the beam width of an antenna component of a heavily loaded sector while widening the beam width of the antenna component of a lightly loaded sector, as one way of adjusting beam component configuration, distributes the traffic from the heavily loaded sector to the lightly loaded sector.

FIGS. 4(*a*)–4(*f*) show various exemplary ways to adjust beam component configuration of the antenna components of the cylindrical antenna array 100. FIG. 4(*a*) illustrates an example of a simple beam configuration of a cylindrical antenna array 100 configured with three antenna components, each of a similar beam pattern and orientation. The traffic load on each of the three antenna components 300A, 302A and 304A is then determined. If it is determined that the load of one or more antenna components is relatively heavier than the others, one way to dynamically adjust the load is to shift or rotate the azimuth angle orientation of the antenna components so as to essentially shift or rotate the beam pattern itself. As such, a first antenna component initially covers the area designated by 300A as shown in FIG. 4(*a*), and is then adjusted to cover the area shown by element 300B in FIG. 4(*b*). Similarly, the beam pattern 302A is adjusted in orientation to cover the area 302B; and the beam pattern 304A is adjusted in orientation to cover the area 304B. In essence, instead of the area of heavy traffic being handled by one antenna component 300A as shown in FIG. 4(*a*), it can be shared by azimuth rotation to be handled between two antenna components covering areas 300B and 304B as shown in FIG. 4(*b*) for example.

Another way to dynamically share or spread the traffic load is shown utilizing FIGS. 4(*c*) and 4(*d*). This method utilizes adjusting the beam configuration or beam width of the beam patterns of the antenna components of the cylindrical antenna array 100. FIG. 4(*c*) illustrates three antenna components of equal beam width, 310A, 312A and 314A. If one of the aforementioned beam patterns or sectors becomes heavily loaded, the beam width of that sector can be narrowed and the beam width of lightly loaded sector(s) can be widened to distribute the traffic from the heavily loaded sector to the lightly loaded sector. For example, if the sector designated by 310A of FIG. 4(*c*) is heavily loaded and the sectors of 312A and 314A are lightly loaded, then the controller 200 is controlled to adjust the beam configuration of the three antenna components so as to narrow the beam width of the sector 310A as shown by element 310B in FIG. 4(*d*), and widen the beam width of sectors 312A and 314A, as shown by elements 312B and 314B of FIG. 4(*d*).

Yet, another way to vary the antenna component configuration of the cylindrical antenna array 100 is to adjust the antenna component number. As a wireless system grows, more and more users are added to the system. One way to handle increased volume of traffic is to replace a three-sector antenna with a six-sector antenna. Using cylindrical array 100, no extra hardware and installation need take place. Assuming controller 200 initially configured the cylindrical array antenna 100 to have three components 320, 330 and 340 as shown in FIG. 4(*e*), once volume increases such that six sectors are necessary to handle the traffic, the controller 200 is then controlled to reconfigure the cylindrical antenna array 100 into a six sector configuration as shown by elements 322, 324, 344, 342, 332 and 334 of FIG. 4(f). This is another way that the controller 200, based upon a determined load on the cylindrical antenna array 100, is controlled to adjust the antenna component configuration of the cylindrical antenna array. It should be noted that the above described methods of varying antenna component configuration are exemplary and not limitative of the invention, and are included as alternate methods of load adjustment for all aspects of the invention previously described.

Figure 5:
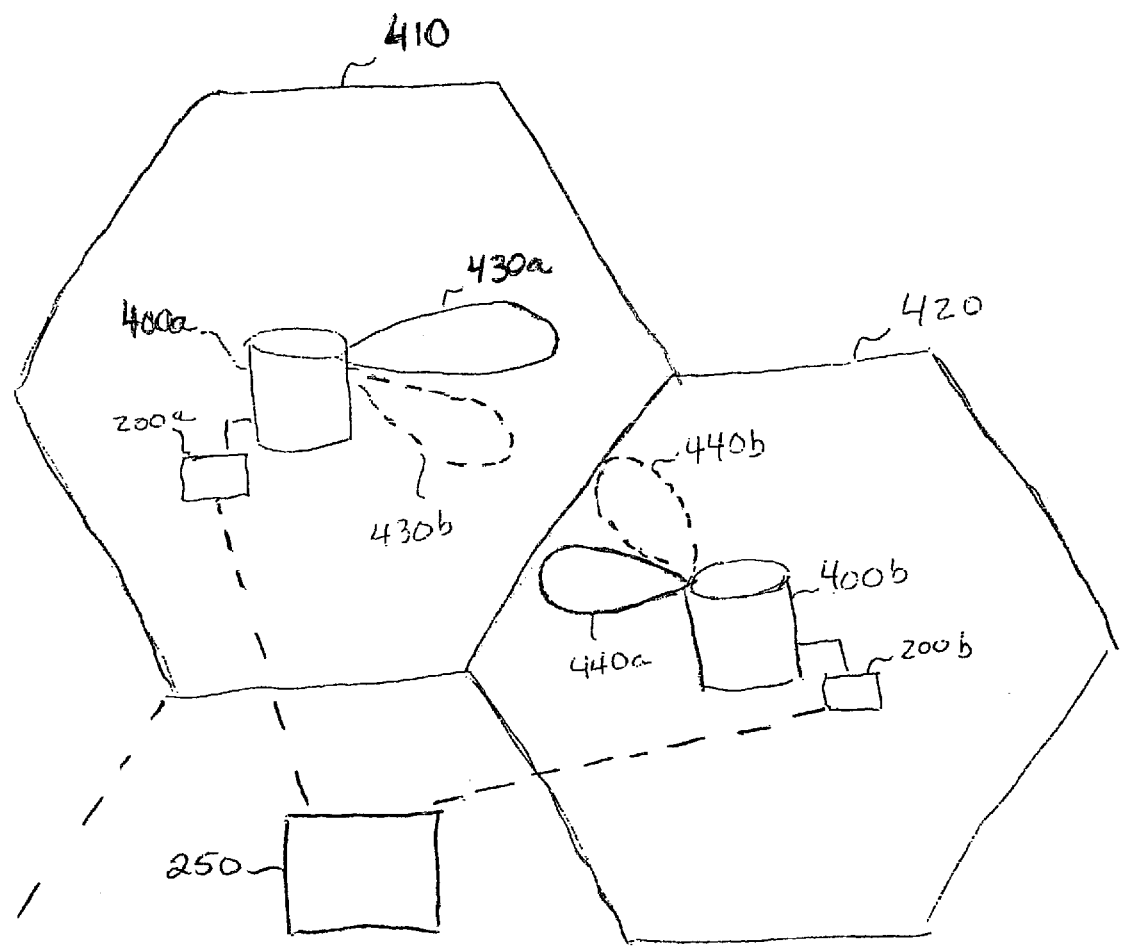
FIG. 5 is an illustration of the system of the present invention being utilized to affect neighboring cells.

Another aspect of the system and method of the present invention is shown in FIG. 5. In this preferred embodiment of the present invention, the antenna system and method is used to distribute traffic load between cells, such as cells 410 and 420 shown in FIG. 5. In some cases, one cell may become heavily loaded while neighboring cells are lightly loaded. This can occur at various times of the day, week, month, year, etc., and can be monitored by receiving pilot power/total transmit power ratios of wireless mobile units using neighboring cells 410 and 420. For example, during morning rush hour, cell 410 could be monitored as having a relatively heavy traffic load. While during evening rush hour, cell 420 could be monitored as having a relatively heavy traffic load. In such a situation it is desirable to distribute traffic load between cells. In this preferred embodiment, the antenna system and method of the present invention achieve such a result.

As previously described, the vertical array aspect of the cylindrical antenna array 100 provides steering tilting capability. Initially, the cylindrical antenna array 400A may be programmed by controller 200A to be sectored into three antenna components each covering three sectors (for example) of a cell such as that shown in FIGS. 4(a), 4(c) and 4(e) for example. The beam 430A of FIG. 5 illustrates a beam configuration of one such antenna component of the cylindrical antenna array 400A (the beam configuration of the other two antenna components not being shown for the sake of clarity). Similarly, another cylindrical antenna array 400B exists in a neighboring cell 420, which also includes a beam configuration of an antenna component 440A with only one of the antenna components being shown in FIG. 5 for the sake of clarity.

The first cylindrical antenna array 400A in the first cell 410 is controlled by controller 200A with the second cylindrical antenna array 400B being controlled by controller 200B in a neighboring cell 420. Upon receiving information indicating that the traffic in a cell is relatively heavy, a load distribution between neighboring cells is determined, and reconfiguration parameters among neighboring cells is determined at a remote location in an automatic or semiautomatic manner based on preset rules, in a manner similar to that previously described regarding within cell configuration. Once reconfiguration parameters among neighboring cells are determined, the BSC controller 250 receives such information for instructing controller 200A to control the vertical components of the cylindrical antenna array 400A so as to down tilt the heavily loaded antenna component 430A of the heavily loaded cell (such as cell 410 for example), to essentially adjust the antenna component configuration to cover the area 430B as shown in cell 210. Similarly, the BSC controller 250 instructs controller 200B to control the configuration of antenna component 440A to be up-tilted to cover the area 440B in cell 420 of FIG. 5, for example. Of course, the instruction need not pass through BSC 250, and may be sent directly to each controller 200A and controller 200B.

The up-tilting of the lightly loaded cell and the down-tilting of the heavily loaded cell shrinks the coverage of the heavily loaded cell and expands the coverage of the lightly loaded cell. The cylindrical antenna array 400B thus bears a relatively increased load and the cylindrical antenna 400A thus bears a slightly lesser load so that load is distributed between neighboring cells 410 and 420. As such, traffic in heavily loaded cells is reduced and is assigned to lightly loaded neighbor cells in real time.

It should be noted that the above described specific examples are merely exemplary of the overall invention. For example, the examples involve a single cylindrical antenna array sectored into a multiple components (three for example) to cover areas of a cell. Instead of sectoring the cylindrical antenna array into components, separate cylindrical antenna arrays could be used. Further, with regard to dynamic load sharing between neighboring cells, although dynamic load sharing between only two cells has been described, one of ordinary skill would understand that the present invention encompasses such dynamic load sharing between three or more neighboring cells. Further, although down-tilting of one antenna component of one cylindrical antenna array and up-tilting of one antenna component of another cylindrical antenna array has been described, the invention also encompasses more than one antenna component of one or both arrays. It further includes up-tilting and down-tilting of different antenna components of the same cylindrical antenna array and all variations and permutations thereof regarding multiple antenna components of cylindrical arrays of neighboring cells. Also, although load detection has been described using transmit power, other ways of determining load are also encompassed within the present invention.

The inventions being thus described, it will be apparent that the same may be varied in many ways. Such variations are not to be regarded as a departure from the spirit and scope of the invention, and all such modifications as would be obvious to one skilled in the art are intended to be included within the scope of the following claims.

What is claimed is:

1. An antenna system comprising:
   a cylindrical antenna array; and
   a controller, for adjusting antenna component configuration of the cylindrical antenna array based upon a load on the antenna components of the cylindrical antenna array.

2. The antenna system of claim 1, wherein the controller adjusts beam configuration of at least two antenna components of the cylindrical antenna array based on respective loads.

3. The antenna system of claim 2, wherein the controller adjusts beam configuration by relatively narrowing beam width of one antenna component of the cylindrical antenna array upon its respective load being relatively heavy and by relatively widening beam width of another antenna component of the cylindrical antenna array upon its respective load being relatively light.

4. The antenna system of claim 1, wherein the antenna system is used in a wireless communication system and the load is a wireless communication call handling load.

5. The antenna system of claim 1, wherein the controller adjusts beam orientation of at least two antenna components of the cylindrical antenna array based on respective loads.

6. The antenna system of claim 5, wherein the controller adjusts beam orientation by changing an azimuth angle of at least two antenna components of the cylindrical antenna array.

7. The antenna system of claim 1, wherein the controller adjusts the number of antenna components of the cylindrical antenna array based on load.

8. The antenna system of claim 1, wherein the load is determined based on a ratio of pilot power to total transmit power.

9. The antenna system of claim 1, wherein the load is remotely monitored and used to determine antenna component configuration adjustments, the controller being remotely controlled to adjust antenna component configuration.

10. The antenna system of claim 1, further comprising:
at least one additional cylindrical antenna array, wherein the loads of each of the at least two cylindrical antenna arrays are monitored to determine antenna component configuration adjustments of at least one antenna component of the cylindrical antenna arrays based upon the monitored loads.

11. The antenna system of claim 10, wherein the controller adjusts beam configuration by relatively narrowing beam width of at least one cylindrical antenna array upon its respective load being relatively heavy and adjusts beam configuration by relatively widening beam width of at least one other cylindrical antenna array upon its respective load being relatively light.

12. The antenna system of claim 10, wherein the antenna system is used in a wireless communication system and the load is a wireless communication call handling load.

13. The antenna system of claim 12, wherein the at least two cylindrical antenna arrays service the same cell.

14. The antenna system of claim 10, wherein a first controller adjusts beam orientation by down-tilting the beam of at least one cylindrical antenna array upon its respective load being relatively heavy and a second controller adjusts beam orientation by up-tilting the beam of at least one other cylindrical antenna array upon its respective load being relatively light.

15. The antenna system of claim 14, wherein the first and second controllers are controlled by a third common controller.

16. The antenna system of claim 14, wherein the antenna system is used in a wireless communication system and the load is a wireless communication call handling load.

17. The antenna system of claim 16, wherein at least one cylindrical antenna array services a first cell and at least one other cylindrical antenna array services a second neighboring cell.

18. The antenna system of claim 8, wherein a first controller adjusts antenna component configuration of a first cylindrical antenna array in a first cell and a second controller adjusts antenna component configuration of a second cylindrical antenna array in a second cell, each of the first and second controllers being operatively connected to a third controller.

19. The antenna system of claim 1, comprising:
two additional cylindrical antenna arrays, wherein loads of all three cylindrical antenna arrays are monitored to dynamically determine antenna component configuration adjustments of at least one antenna component of the cylindrical antenna arrays based upon the monitored loads.

20. The antenna system of claim 19, wherein the antenna system is used in a cell of a wireless communication system and the cylindrical antenna arrays operate to handle wireless communication calls.

21. A method for adjusting antenna components of a cylindrical antenna array to redistribute load, comprising:
providing a cylindrical antenna array, including a plurality of antenna components, in a wireless communication system; and
adjusting antenna component configuration of the cylindrical array based upon adjustments determined from load on the antenna components of the cylindrical antenna array.

22. The method of claim 21, wherein load is determined based on a ratio of pilot power to total transmit power.

23. The method of claim 22, wherein the step of adjusting includes:
adjusting beam configuration of at least two antenna components of the cylindrical antenna array based upon respective loads.

24. The method of claim 23, wherein the step of adjusting includes:
adjusting beam configuration by relatively narrowing beam width of one antenna component of the cylindrical antenna array upon its respective load being relatively heavy, and
adjusting beam width configuration by relatively widening beam width of another antenna component of the cylindrical antenna array upon its respective load being relatively light.

25. The method of claim 21, wherein the step of adjusting includes:
adjusting beam orientation of at least two antenna components of the cylindrical antenna array based upon their respective loads.

26. The method of claim 25, wherein the step of adjusting includes:
adjusting beam orientation by changing an azimuth angle of at least two antenna components the cylindrical antenna array based upon respective loads.

27. The method of claim 21, wherein the step of adjusting includes:
adjusting the number of antenna components of the cylindrical antenna array based upon the load.

28. The method of claim 21, wherein antenna component configuration adjustments are determined from monitored loads of a plurality of cylindrical antenna arrays in a common. cell.

29. The method of claim 28, wherein beam configuration of at least one cylindrical antenna array is relatively narrowed upon its respective load being relatively heavy and beam configuration of at least one cylindrical antenna array is relatively widened upon its respective load being relatively light.

30. The method of claim 21, wherein antenna component configuration adjustments are determined from monitored loads of a plurality of cylindrical antenna arrays in neighboring cells.

31. The method of claim 30, wherein the step of adjusting includes down-tilting a beam of at least one antenna component of at least one cylindrical antenna array in one cell upon its respective load being relatively heavy and up-tilting a beam of at least one antenna component of at least one other cylindrical antenna array in a neighboring cell upon its respective load being relatively light.

32. The method of claim 31, wherein the load is a wireless communication call handling load.

33. The method of claim 30, wherein the load is determined based on a ratio of pilot power to total transmit power.

* * * * *